United States Patent [19]

Imai et al.

[11] Patent Number: 5,739,231
[45] Date of Patent: Apr. 14, 1998

[54] METAL SURFACE TREATMENT AGENT

[75] Inventors: Yohji Imai, Chiba; Yosuke Taira, Nagasaki; Tetsuro Sakuma, Kawagoe, all of Japan

[73] Assignee: GC Corporation, Tokyo, Japan

[21] Appl. No.: 418,616

[22] Filed: Apr. 7, 1995

[30] Foreign Application Priority Data

Apr. 8, 1994 [JP] Japan .................. 6-093897

[51] Int. Cl.$^6$ .................. C08F 30/02
[52] U.S. Cl. .................. 526/274; 524/547; 524/807; 526/204; 526/217; 526/277; 526/274; 427/207.1; 427/287; 427/388.1; 427/388.4
[58] Field of Search .................. 524/547, 807; 526/277, 274, 204, 217; 427/207.1, 287, 388.4, 388.1

[56] References Cited

U.S. PATENT DOCUMENTS

| | | |
|---|---|---|
| 4,515,930 | 5/1985 | Omura et al. ............ 524/547 X |
| 4,771,084 | 9/1988 | Kubuto et al. . |
| 4,804,690 | 2/1989 | Kubota et al. . |
| 4,820,744 | 4/1989 | Kubota et al. . |
| 4,843,110 | 6/1989 | Kubota et al. . |
| 5,043,361 | 8/1991 | Kubota et al. . |
| 5,234,971 | 8/1993 | Imai et al. . |
| 5,252,629 | 10/1993 | Imai et al. . |
| 5,288,341 | 2/1994 | Kojima et al. . |
| 5,290,172 | 3/1994 | Sakuma et al. . |
| 5,356,951 | 10/1994 | Yeam et al. . |
| 5,364,890 | 11/1994 | Sakuma et al. . |

FOREIGN PATENT DOCUMENTS

| | | | |
|---|---|---|---|
| 2616946 | 11/1976 | Germany ............ | 526/277 |
| 0007703 | 5/1968 | Japan ............ | 526/277 |
| 0020008 | 2/1981 | Japan ............ | 526/277 |
| 0109211 | 8/1981 | Japan ............ | 526/277 |
| 0219272 | 12/1983 | Japan ............ | 526/277 |
| 0142268 | 8/1984 | Japan ............ | 526/277 |
| 0208313 | 10/1985 | Japan ............ | 526/277 |
| 0034083 | 2/1986 | Japan ............ | 526/277 |
| 0090276 | 4/1989 | Japan ............ | 526/277 |
| 1138282 | 5/1989 | Japan . | |
| 00321613 | 12/1992 | Japan ............ | 526/274 |
| 3414165 | 10/1985 | United Kingdom .......... | 526/277 |
| 2260984 | 5/1993 | United Kingdom .......... | 526/274 |

Primary Examiner—Judy M. Reddick
Attorney, Agent, or Firm—Oblon, Spivak, McClelland, Maier & Neustadt, P.C.

[57] ABSTRACT

A metal surface treatment agent is disclosed, comprising: (a) from 0.001 to 10% by weight of a polymerizable monomer containing a thiophosphoric acid chloride group therein and (b) from 0.001 to 10% by weight of a polymerizable monomer containing a phosphoric acid ester group therein, and optionally, (c) from 0.1 to 5% by weight of a polymerization initiator dissolved in an organic solvent.

8 Claims, No Drawings

METAL SURFACE TREATMENT AGENT

FIELD OF THE INVENTION

The present invention relates to adhesion of metals. More particularly, the present invention is related to a metal surface treatment agent which is used for preliminary treatment of a metal surface as an adherent in adhering a macro-molecular material to a metal.

BACKGROUND OF THE INVENTION

Among metals, noble metals which are chemically stable, such as gold, platinum, and palladium, or noble metal alloys containing the same as a major component, are extremely difficult for adhesion as compared with base metals such as cobalt, chromium, nickel, titanium, iron, and copper, and alloys thereof. Thoroughly satisfactory technologies have not been substantially developed yet.

As attempts for improving the adhesion of noble metals, a process for coating a primer, a sandblast process for physically roughing the metal surface, a process for plating tin, a process for oxidizing the metal surface, and the like have been proposed. Of these proposed processes, the process for coating a primer is most simple, and examples thereof include a process for using 6-(4-vinylbenzyl-n-propyl)amino-1,3,5-triazin-2,4-dithione (VBATDT) (see Japanese Patent Lid-Open No. 64-83254) and a process for using a monomer containing a thiophosphoric acid group therein (see Japanese Patent Laid-Open No. 1-138282 and Japanese Patent Laid-Open No. 3-310122).

Although many of the above-described prior technologies are admitted to have an effect under dry conditions, they involve such defects that the water resistance is low and that the durability is poor. On the other hand, the process for coating a primer is free from these problems and hence, is considered to be a preferred process.

Of the processes for coating a primer, the process for using VBATDT involves such a problem that the type of a metal to be coated is restricted. Furthermore, although the process for using a monomer containing a thiophosphoric acid group therein was surely effective, it involved such a problem that a substance to be used as a monomer is unstable and difficult in storage and handling. In addition, while in order to dissolve the problem involved in the process for using a monomer containing a thiophosphoric acid group therein, an attempt was made by using a polymerizable-monomer containing a thiophosphoric acid chloride group therein as a precursor thereof, certain problems still remained with respect to the durability to base metals among other metals.

SUMMARY OF THE INVENTION

Thus, an object of the present invention is to find out a new pretreatment agent that is free from any restriction with respect to the type of a metal to be coated, is superior in durability, and which involves less problems in storage and handling.

In the case of using a polymerizable monomer containing a thiophosphoric acid chloride group therein alone, though the adhesion durability to a noble metal was superior, there was problems in durability depending on the type of a base metal. On the other hand, in the case of using a polymerizable monomer containing a phosphoric acid ester group therein alone, the adhesion durability was superior to a base metal but inferior to a noble metal. In order to dissolve these problems, a pretreatment agent having superior durability to all of individual metals to be coated has been found out, such pretreatment agent combining a polymerizable monomer containing a thiophosphoric acid chloride group therein with a polymerizable monomer containing a phosphoric acid ester group therein to utilize a synergistic effect, such durability thereto being better than that when a polymerizable monomer along is used. Also, it has been found that the durability is further improved by subjecting to a heat treatment and the like, or by adding a polymerization initiator and then subjecting to a heat treatment.

The present invention is constructed by a composition comprising:

(a) from 0.001 to 10% by weight of a polymerizable monomer containing a thiophosphoric acid chloride group therein and (b) from 0.001 to 10% by weight of a polymerizable monomer containing a phosphoric acid ester group therein, and optionally (c) from 0.1 to 5% by weight of a polymerization initiator dissolved in an organic solvent.

DETAILED DESCRIPTION OF THE INVENTION

As the polymerizable monomer (a) containing a thiophosphoric acid chloride group therein, compounds represented by the following formulae can be used.

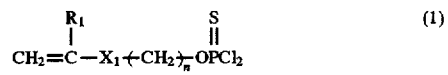

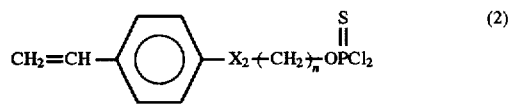

In the above formulae, $X_1$ represents —COO— or —CONH—; $R_1$ represents H or $CH_3$; $X_2$ represents —COO—, —CONH—, —CH$_2$—, or —O—; and n represents an integer of from 1 to 16.

Preferably, the following specific compounds can be used.

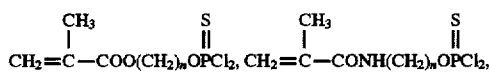

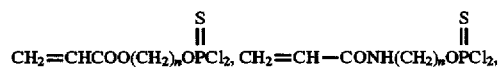

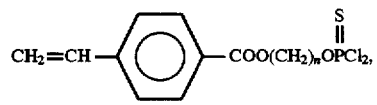

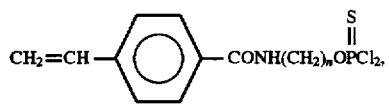

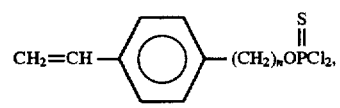

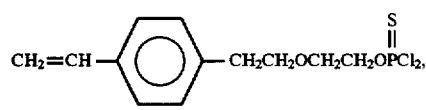

-continued

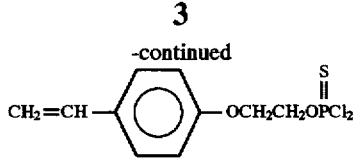

In the above formulae, n represents an integer of from 1 to 16.

As the polymerizable monomer (b) containing a phosphoric acid ester group therein, compounds represented by the following formula can be used.

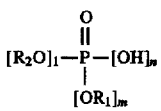

In the above formula, $R_1$ is selected from the group consisting of $CH_2=CHCOOR_3$, $CH_2=C(CH_3)COOR_3$, $CH_2=CHCOOR_4OR_3$, and $CH_2=C(CH_3)COOR_4OR_3$, wherein $R_3$ represents an alkylene group having from 1 to 12 carbon atoms, and $R_4$ represents an alkylene group having from 1 to 12 carbon atoms; $R_2$ represents an alkyl group having from 1 to 12 carbon atoms; l is 0 or 1; m is 1 or 2; n is 1 or 2; and l+m+n is 3.

Preferably, the following specific compounds can be used.

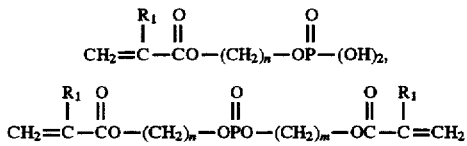

In the above formulae, $R_1$ represents H or $CH_3$; and n and m each represents an integer of from 1 to 16.

The concentration of each of the polymerizable monomer containing a thiophosphoric acid chloride group therein and the polymerizable monomer containing a phosphoric acid ester group therein is in the range of from 0.001 to 10% by weight, and preferably from 0.01 to 5% by weight based on the weight of the organic solvent, and the concentration is required to be varied depending on the treatment process to be used. That is, in a low-concentration solution having a concentration of from about 0.01 to 1.0% by weight, it is possible to coat the solution on a metal surface or immerse the metal with the solution, dry the solvent, and then achieve the adhesion as it stands. However, in the case of using a treatment solution having a higher concentration than the foregoing, it is required to once coat the treatment solution and then thoroughly wipe out the excess or wash it out. In other words, it is considered that the effect is realized when the concentration of the component considered to contribute to the adhesion is extremely low and that it is more effective when no excess is present.

In any case including the case of a low concentration, in order to improve the adhesive force, it is generally preferred to undergo washing. Suitable examples of solvents useful for washing include organic solvents such as methanol, ethanol, isopropanol, acetone, methyl ethyl ketone, tetrahydrofuran, chloroform, dichloromethane, ethyl acetate, and methyl methacrylate, and mixtures thereof.

With respect to the polymerization initiator (c), it is required to consider the construction of the treatment agent per se. Although a one-pack type and a two- or more-pack type may be considered as the metal surface treatment agent, the one-pack type is preferred while taking into account the operability.

As the two-pack type, a combination of benzoyl peroxide and a tertiary amine, a combination of benzoyl peroxide and N-phenylglycine, a combination of benzoyl peroxide and sodium p-toluenesulfinate, a combination of benzoyl peroxide, and sodium benzenesulfinate, a combination of benzoyl peroxide and sodium p-toluenesulfinate and an aromatic tertiary amine, a combination of benzoyl peroxide, and sodium benzenesulfinate a combination of benzoin peroxide, sodium p-benzenesulfinate and an aromatic tertiary amine, a combination of benzoyl peroxide, sodium benzenesulfinate and an aromatic tertiary amine, a combination of potassium persulfate and an aromatic tertiary amine, a combination of sodium persulfate and an aromatic tertiary amine, and the like can be severally employed.

As the one-pack type, the addition of an organic peroxide can be considered. Suitable examples of the organic peroxide include benzoyl peroxide, parachlorobenzoyl peroxide, 2,4-dichlorobenzoyl peroxide, acetyl peroxide, lauroyl peroxide, tertiary butyl peroxide, cumene hydroperoxide, 2,5-dimethylhexane 2,5-dihydroperoxide, methyl ethyl ketone peroxide, tertiary butyl peroxide benzoate, azo compounds such as azobisisobutyronitrile, and organic acid compounds such as tributyl borate.

Examples of the organic solvent which is used for dissolving the components (a), (b) and (c) therein include acetone, methyl ethyl ketone, tetrahydrofuran, dioxane, ethyl acetate, methyl methacrylate, chloroform, dichloromethane, benzene, toluene, and mixtures thereof.

Although the polymerizable monomer containing a thiophosphoric acid chloride group therein may be used as it stands, a composition prepared by dissolving the polymerizable monomer containing a thiophosphoric acid chloride group therein in the above-described organic solvent and then adding from 1 to 5 molar equivalents of water and from 1 to 5 molar equivalents of a tertiary amine thereto can be used. Examples of the tertiary amine include triethylamine, tripropylamine, tributylamine, and pridine.

The thus pretreated metal surface is applied with a polymerization-setting macromolecular material containing a polymerizable double bond-containing monomer and a polymerization initiator as components.

Also, the adhesion to a metal is improved by applying a heat treatment after the metal surface treatment.

Examples of the metal to be coated in the present invention include metals such as gold, platinum, silver, palladium, cobalt, chromium, nickel, titanium, iron, tin, zinc, and copper, and alloys thereof.

While the present invention is described below with reference to the following Examples, it is to be construed that the present invention is not limited thereto.

As a preliminary stage to be performed, of a metal surface treatment agent was prepared. Solution A containing 0.4 part by weight of 10-methacryloyloxydecyl thiophosphoric acid dichloride as the polymerizable monomer containing a thiophosphoric acid chloride group therein and methyl methacrylate as the solvent was prepared.

In addition, Solution B was prepared by adding 0.020 part by weight of 1 molar equivalant of water and 0.088 part by weight of 1 molar equivalent of triethylamine corresponding to 10-methacryloyloxydecyl thiophosphoric acid dichloride to Solution A. Solution C was prepared by adding 0.040 part by weight of 2 molar equivalants of water and 0.176 part by weight of 2 molar equivalents of triethylamine corresponding to 10-methacryloyloxydecyl thiophosphoric acid dichloride to Solution A. Solution D was prepared by dissolving 2.5 parts by weight of 10-methacryloyloxydecyl phosphoric acid ester as the polymerizable monomer containing a phosphoric acid ester group therein in acetone. Solution E was prepared by adding 1 part by weight of benzoyl peroxide to Solution D. Solutions F and G were respectively prepared by replacing the monomer containing a phosphoric acid ester group therein of Solutions D and E by di(2-methacryloyloxy) phosphoric acid ester.

Solution A

| | |
|---|---|
| Methyl methacrylate | 99.6 parts by weight |
| 10-Methacryloyloxydecyl thiophosphoric acid dichloride | 0.4 part by weight |

Solution B

| | |
|---|---|
| Methyl methacrylate | 99.6 parts by weight |
| 10-Methacryloyloxydecyl thiophosphoric acid dichloride | 0.4 part by weight |
| Water | 0.020 part by weight |
| Triethylamine | 0.088 part by weight |

Solution C

| | |
|---|---|
| Methyl methacrylate | 99.6 parts by weight |
| 10-Methacryloyloxydecyl thiophosphoric acid dichloride | 0.4 part by weight |
| Water | 0.040 part by weight |
| Triethylamine | 0.176 part by weight |

Solution D

| | |
|---|---|
| Acetone | 97.5 parts by weight |
| 10-Methacryloyloxydecyl phosphoric acid ester | 2.5 parts by weight |

Solution E

| | |
|---|---|
| Acetone | 97.5 parts by weight |
| 10-Methacryloyloxydecyl phosphoric acid ester | 2.5 parts by weight |
| Benzoyl peroxide | 1.0 part by weight |

Solution F

| | |
|---|---|
| Acetone | 97.5 parts by weight |
| Di(2-methacryloyloxyethyl) phosphoric acid ester | 2.5 parts by weight |

Solution G

| | |
|---|---|
| Acetone | 97.5 parts by weight |
| Di(2-methacryloyloxyethyl) phosphoric acid ester | 2.5 parts by weight |
| Benzoyl peroxide | 1.0 part by weight |

EXAMPLE 1

Metallic columns having a diameter of from 6 to 10 mm and a height of from 3 to 6.5 mm were prepared as test specimens and finished by using silicon carbide-made polishing papers #220, #400 and #600.

After washing the metal surface with acetone, Solution A was mixed with Solution D, and the mixed solution was applied on the metal surface by means of a brush. After allowing to stand for air drying for 10 minutes, the metal surface was immersed with acetone for 24 hours. Thereafter, the metal surface was taken out from the acetone and provided as a test specimen for adhesion.

On the thus surface-treated metal surfaces, an adhesive tape provided with a hole having a diameter of 5 mm was stuck to provide the surface with an adhesion area. A paste comprising methyl methacrylate containing 10% by weight of a tributylborane-partially oxidized material (TBBO) and polymethyl methacrylate was put thereon, an acrylic stick was pressed thereon, and the both were then adhered each other. After allowing the test specimen to stand in water at 37° C. for one day, a thermal cycle test in which the test specimen was alternately dipped in water at 4° C. and 60° C. for one minute, respectively was repeated 2,000 times. Thereafter, the test specimen was subjected to a tensile test at a rate of 2 mm/min. With respect to five test specimens for adhesion, the measurement was taken, and an average value was calculated.

As the metals used for these tests, four kinds of metals of Casting Gold M. C. TYPE IV (a trade name of GC Corporation) as a gold alloy, Castwel M. C. gold 12% (made by GC Corporation) as a gold-silver-palladium alloy, T-Alloy (a trade name of GC Corporation) as titanium, and Metacast (a trade name of Sun Medical Co., Ltd.) as a cobalt-chromium alloy were employed. The results obtained are shown in Table 2.

EXAMPLE 2

The same test as in Example 1 was followed, except that Solution B was used in place of Solution A. The results obtained are shown in Table 2.

EXAMPLE 3

The same test as in Example 1 was followed, except that Solution C was used in place of Solution A. The results obtained are shown in Table 2.

EXAMPLE 4

The same mixed solution of Solution A with Solution D as in Example 1 was applied on a metal surface, and after allowing to stand for air drying for 10 minutes, the metal surface was subjected to a heat treatment at 60° C. for one minute. Thereafter, the test specimen was immersed with acetone for 24 hours and subjected to the same test as in Example 1. The results obtained are shown in Table 2.

EXAMPLE 5

The same test as in Example 4 was followed, except that Solution D used in the metal surface treatment was replaced by Solution E. The results obtained are shown in Table 2.

EXAMPLE 6

The same test as in Example 1 was followed, except that the mixed solution of Solution A with Solution D was replaced by a mixed solution of Solution C with Solution F. The results obtained are shown in Table 2.

EXAMPLE 7

The same test as in Example 4 was followed, except that the mixed solution of Solution A with Solution D was replaced by a mixed solution of Solution C with Solution G. The results obtained are shown in Table 2.

EXAMPLE 8

The following solutions were prepared.
Solution H

| | |
|---|---|
| Methyl methacrylate | 99.98 parts by weight |
| 10-Methacryloyloxydecyl thiophosphoric acid dichloride | 0.02 part by weight |
| Water | 0.002 part by weight |
| Triethylamine | 0.009 part by weight |

Solution I

| | |
|---|---|
| Acetone | 99.98 parts by weight |
| 10-Methacryloyloxydecyl phosphoric acid ester | 0.02 part by weight |

The same procedures as in Example 1 were followed, except that Solution H was used in place of Solution A, Solution I was used in place of Solution D, after mixing Solution H with Solution I, the mixed solution was applied on a metal surface, and that an adhesive tape provided with a hole having a diameter of 5 mm was stuck at the same time when the metal surface was dried to provide the surface with an adhesion area, without undergoing washing with a solvent. The same test as in Example 1 was followed, except that a paste comprising methyl methacrylate containing 10% by weight of a tributylborane-partially oxidized material (TBBO) and polymethyl methacrylate was put thereon, an acrylic stick was pressed thereon, and that the both were then adhered each other. The results obtained are shown in Table 2.

EXAMPLE 9

The same prodedures as in Example 8 were followed, except that after mixing Solution H with Solution I, the mixed solution was applied on a metal surface, which was then subjected to a heat treatment at 60° C. for one minute, without undergoing washing with a solvent. The results obtained are shown in Table 2.

EXAMPLE 10

The following solutions were prepared.
Solution J

| | |
|---|---|
| Methyl methacrylate | 99.98 parts by weight |
| 10-Methacryloyloxydecyl thiophosphoric acid dichloride | 0.02 part by weight |
| Water | 0.002 part by weight |
| Triethylamine | 0.009 part by weight |
| Sodium benzenesulfinate | 1.0 part by weight |
| Diethanol p-toluidine | 0.5 part by weight |

Solution K

| | |
|---|---|
| Acetone | 99.98 parts by weight |
| 10-Methacryloyloxydecyl phosphoric acid ester | 0.02 part by weight |
| Benzoyl peroxide | 1.0 part by weight |

The same procedures as in Example 8 were followed, except that Solution J was used in place of Solution H, Solution K was used in place of Solution I and that after mixing Solution J with Solution K, the mixed solution was applied on a metal surface. The results obtained are shown in Table 2.

EXAMPLE 11

The following solution was prepared.
Solution L

| | |
|---|---|
| Dichloromethane | 99.6 parts by weight |
| 10-Methacryloyloxydecyl thiophosphoric acid dichloride | 0.2 part by weight |
| Water | 0.020 part by weight |
| Triethylamine | 0.088 part by weight |
| 10-Methacryloyloxydecyl phosphoric acid ester | 0.2 part by weight |

The same procedures as in Example 8 were followed, except that Solution L was used in place of the mixed solution of Solution H with Solution 8 and applied on a metal surface and that an adhesive tape provided with a hole having a diameter of 5 mm was stuck at the same time when the metal surface was dried to provide the surface with an adhesion area, without undergoing washing with a solvent. The same test as in Example 1 was followed, except that a paste comprising methyl methacrylate containing 10% by weight of a tributylborane-partially oxidized material (TBBO) and polymethyl methacrylate was put thereon, an acrylic stick was pressed thereon, and that the both were then adhered each other. The results obtained are shown in Table 2.

EXAMPLE 12

The following solution was prepared.
Solution M

| | |
|---|---|
| Dichloromethane | 99.6 parts by weight |
| 10-Methacryloyloxydecyl thiophosphoric acid dichloride | 0.4 part by weight |
| Water | 0.040 part by weight |
| Triethylamine | 0.176 part by weight |
| 10-Methacryloyloxydecyl phosphoric acid ester | 2.5 parts by weight |
| Benzoyl peroxide | 1.0 part by weight |

The same procedures as in Example 11 were followed, except that Solution M was used in place of Solution L and applied on a metal surface, which was then subjected to a heat treatment at 60° C. for one minute. The results obtained are shown in Table 2.

EXAMPLES 13 TO 18

The same adhesion test as in Example 12 was followed, except that after applying Solution M, the heat treatment time and heating temperature were varied as tabulated below (Table 1) and the results obtained are shown in Table 2.

TABLE 1

| Example No. | Heating temperature | Heat treatment time condition |
|---|---|---|
| 13 | 45° C. | 1 min. |
| 14 | 45° C. | 60 min. |
| 15 | 60° C. | 30 sec. |
| 16 | 60° C. | 60 min. |
| 17 | 100° C. | 1 min. |
| 18 | 100° C. | 30 min. |

COMPARATIVE EXAMPLE 1

The test was carried out on the assumption that only a monomer containing a thiophosphoric acid chloride group therein was used. That is, the same test as in Example 1 was followed, except that only Solution A was applied as the metal surface treatment agent on a metal surface. The results obtained are shown in Table 2.

COMPARATIVE EXAMPLE 2

The test was carried out in the case in which only a monomer containing a thiophosphoric acid chloride group therein was used, and after applying the solution, no washing was performed. That is, the same test as in Example 8 was followed, except that only Solution H was applied as the metal surface treatment agent on a metal surface. The results obtained are shown in Table 2.

COMPARATIVE EXAMPLE 3

The test was carried out in the case in which only a monomer containing a thiophosphoric acid chloride group therein was used, and after applying the solution, a heat treatment was performed, without undergoing washing. That is, the same test as in Example 9 was followed, except that only Solution H was applied as the metal surface treatment agent on a metal surface. The results obtained are shown in Table 2.

COMPARATIVE EXAMPLE 4

The test was carried out on the assumption that only a monomer containing a phosphoric acid ester group therein was used. That is, the same test as in Example 1 was followed, except that only Solution D was applied as the metal surface treatment agent on a metal surface. The results obtained are shown in Table 2.

COMPARATIVE EXAMPLE 5

Solution X was prepared by dissolving 2.5 parts by weight of 4-methacryloyloxyethoxycarbonyl phthalic anhydride (4-META) which is considered to be effective for adhesion of a metal in acetone. The results obtained are shown in Table 2.
Solution X

| | |
|---|---|
| Acetone | 97.5 parts by weight |
| 4-Methacryloyloxyethoxycarbonyl phthalic anhydride | 2.5 parts by weight |

The same test as in Example 8 was followed, except that only Solution X was applied as the metal surface treatment agent on a metal surface. The results obtained are shown in Table 2.

COMPARATIVE EXAMPLE 6

Solution Y was prepared by dissolving 2.5 parts by weight of 6-(4-vinylbenzyl-n-propyl)amino-1,3,5-triazin-2,4-dithione (VBATDT) which is considered to be effective for adhesion of a metal in acetone. The results obtained are shown in Table 2.
Solution Y

| | |
|---|---|
| Acetone | 97.5 parts by weight |
| 6-(4-Vinylbenzyl-n-propyl)amino-1,3,5-triazin-2,4-dithione | 2.5 parts by weight |

The same test as in Example 8 was followed, except that only Solution Y was applied as the metal surface treatment agent on a metal surface. The results obtained are shown in Table 2.

TABLE 2

| | Tensile Strength, MPa | | | |
|---|---|---|---|---|
| | Gold alloy | Gold-silver-palladium alloy | Titanium | Cobalt-chromiumalloy |
| Example 1 | 20.3 | 18.7 | 21.5 | 22.9 |
| Example 2 | 29.6 | 19.1 | 22.2 | 23.0 |
| Example 3 | 21.0 | 14.4 | 18.8 | 19.7 |
| Example 4 | 23.2 | 23.8 | 24.6 | 28.1 |
| Example 5 | 18.7 | 20.4 | 20.5 | 22.1 |
| Example 6 | 17.6 | 13.7 | — | — |
| Example 7 | 17.3 | 23.9 | — | — |
| Example 8 | 18.9 | 18.5 | 22.5 | 23.9 |
| Example 9 | 22.5 | 23.0 | 26.1 | 25.3 |
| Example 10 | 20.6 | 17.3 | 23.6 | 25.0 |
| Example 11 | 19.9 | 18.0 | 20.1 | 26.0 |
| Example 12 | 21.5 | 23.6 | 24.8 | 24.1 |
| Example 13 | 22.5 | 22.9 | 26.5 | 25.6 |
| Example 14 | 23.4 | 22.1 | 24.1 | 26.9 |
| Example 15 | 23.2 | 23.6 | 25.8 | 23.7 |
| Example 16 | 22.9 | 24.1 | 26.3 | 26.1 |
| Example 17 | 21.2 | 22.0 | 25.9 | 27.4 |
| Example 18 | 22.5 | 21.3 | 23.8 | 24.9 |
| Comparative Example 1 | 18.3 | 4.7 | 0.5 | 0.4 |
| Comparative Example 2 | 16.2 | 6.9 | 0.5 | 1.0 |
| Comparative Example 3 | 19.0 | 8.9 | 2.0 | 4.5 |
| Comparative Example 4 | 1.3 | 0.3 | 20.0 | 20.0 |
| Comparative Example 5 | 0.0 | 0.0 | 8.5 | 19.8 |
| Comparative Example 6 | 5.3 | 2.6 | 0.1 | 0.3 |

As is clear from the results shown in Table 2 regarding the Examples and Comparative Examples, in the case of using only a polymerizable monomer containing a thiophosphoric acid chloride group therein, while the adhesion durability to a noble metal was superior, the durability to a base metal was inferior (Comparative Examples 1 to 3). Also, in the case of using only a polymerizable monomer containing a phosphoric acid ester group therein, while the adhesion durability to a base metal was superior, the durability to a noble metal was inferior (Comparative Example 4). On the other hand, because of the synergistic effect caused by a combination of a polymerizable monomer containing a thiophosphoric acid chloride group therein with a polymerizable monomer containing a phosphoric acid ester group therein, it has been confirmed that the durability to all of individual metals to be coated was superior to that in the case of the use each of the monomers (Examples 1 to 3, 6, 8, 10 and 11)only. Also, it is understood that the durability was more superior when a heat treatment was carried out, or when after adding a polymerization initiator, a heat treatment was carried out (Examples 4, 5, 7, 9 and 12 to 18).

As described above, the treatment process according to the present invention is effective against all metals. In accordance with the conventional processes, complicated processes such as tin plating and oxidation treatment have been applied to noble metals which are difficult in adhesion. However, according to the present invention, a strong adhesive strength with superior durability to both of noble metals and base metals can be obtained in a simple process of coating a treatment agent.

While the invention has been described in detail and with reference to specific embodiments thereof, it will be apparent to one skilled in the art that various changes and modifications can be made therein without departing from the spirit and scope thereof.

What is claimed is:

1. A metal surface treatment agent comprising:

(a) from 0.001 to 10% by weight of a polymerizable monomer containing a thiophosphoric acid chloride group therein and (b) from 0.001 to 10% by weight of a polymerizable monomer containing a phosphoric acid ester group therein dissolved in an organic solvent, wherein all percentages are based on weight of organic solvent.

2. A metal surface treatment agent as in claim 1, wherein from 1 to 5 molar equivalents of water and from 1 to 5 molar equivalents of a tertiary amine, both amounts being based on total amount of component (a), are added to said polymerizable monomer containing a thiophosphoric acid chloride group therein.

3. A metal surface treatment agent as in claim 1, wherein said polymerizable monomer containing a thiophosphoric acid chloride group therein is a compound represented by the following formula (1) or (2):

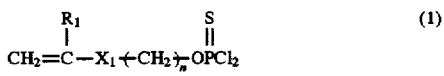

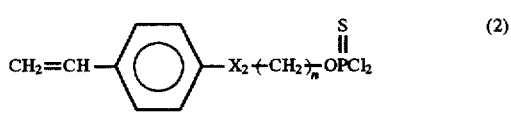

wherein $X_1$ represents —COO— or —CONH—; $R_1$ represents H or $CH_3$; $X_2$ represents —COO—, —CONH—, —$CH_2$—, or —O—; and n represents an integer of from 1 to 16.

4. A metal surface treatment agent as in claim 1, wherein said polymerizable monomer containing a phosphoric acid ester group therein is a compound represented by the following formula:

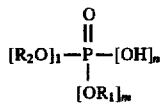

wherein $R_1$ is selected from the group consisting of $CH_2$=$CHCOOR_3$, $CH_2$=$C(CH_3)COOR_3$, $CH_2$=$CHCOOR_4OR_3$, and $CH_2$=$C(CH_3)COOR_4OR_3$, wherein $R_3$ represents an alkylene group having from 1 to 12 carbon atoms, and $R_4$ represents an alkylene group having from 1 to 12 carbon atoms; $R_2$ represents an alkyl group having from 1 to 12 carbon atoms; l is 0 or 1; m is 1 or 2; n is 1 or 2; and l+m+n is 3.

5. A metal surface treatment agent comprising:

(a) from 0.001 to 10% by weight of a polymerizable monomer containing a thiophosphoric acid chloride group therein, (b) from 0.001 to 10% by weight of a polymerizable monomer containing a phosphoric acid ester group therein, and (c) from 0.1 to 5% by weight of a polymerization initiator dissolved in an organic solvent, wherein all percentages are based on weight of organic solvent.

6. A metal surface treatment agent as in claim 5, wherein from 1 to 5 molar equivalents of water and from 1 to 5 molar equivalents of a tertiary amine, both amounts being based on total amount of component (a), are added to said polymerizable monomer containing a thiophosphoric acid chloride group therein.

7. A metal surface treatment agent as in claim 5, wherein said polymerizable monomer containing a thiophosphoric acid chloride group therein is a compound represented by the following formula (1) or (2):

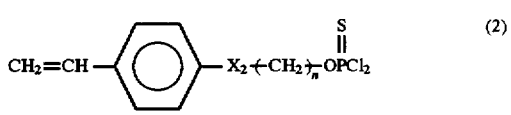

wherein $X_1$ represents —COO— or —CONH—; $R_1$ represents H or $CH_3$; $X_2$ represents —COO—, —CONH—, —$CH_2$—, or —O—; and n represents an integer of from 1 to 16.

8. A metal surface treatment agent as in claim 5, wherein said polymerizable monomer containing a phosphoric acid ester group therein is a compound represented by the following formula:

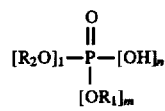

wherein $R_1$ is selected from the group consisting of $CH_2$=$CHCOOR_3$, $CH_2$=$C(CH_3)COOR_3$, $CH_2$=$CHCOOR_4OR_3$, and $CH_2$=$C(CH_3)COOR_4OR_3$, wherein $R_3$ represents an alkylene group having from 1 to 12 carbon atoms, and $R_4$ represents an alkylene group having from 1 to 12 carbon atoms; $R_2$ represents an alkyl group having from 1 to 12 carbon atoms; l is 0 or 1; m is 1 or 2; n is 1 or 2; and l+m+n is 3.

* * * * *